United States Patent
Akiyama

(10) Patent No.: US 9,126,561 B2
(45) Date of Patent: Sep. 8, 2015

(54) SIDE AIRBAG DEVICE FOR VEHICLE

(71) Applicant: Fumito Akiyama, Toyota (JP)

(72) Inventor: Fumito Akiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/219,602

(22) Filed: Mar. 19, 2014

(65) Prior Publication Data

US 2014/0284906 A1 Sep. 25, 2014

(30) Foreign Application Priority Data

Mar. 22, 2013 (JP) .................... 2013-060915

(51) Int. Cl.
| | |
|---|---|
| *B60R 21/233* | (2006.01) |
| *B60R 21/207* | (2006.01) |
| *B60R 21/231* | (2011.01) |
| *B60R 21/2338* | (2011.01) |

(52) U.S. Cl.
CPC ............ *B60R 21/233* (2013.01); *B60R 21/207* (2013.01); *B60R 21/23138* (2013.01); *B60R 2021/23146* (2013.01); *B60R 2021/23324* (2013.01); *B60R 2021/23382* (2013.01)

(58) Field of Classification Search
CPC  B60R 21/233; B60R 21/2338; B60R 21/207; B60R 2021/23324; B60R 2021/23382
USPC ................. 280/729, 730.2, 743.2, 743.1, 742
See application file for complete search history.

(56) References Cited

U.S. PATENT DOCUMENTS

| | | | |
|---|---|---|---|
| 6,349,964 B1 | 2/2002 | Acker et al. | |
| 7,168,733 B2* | 1/2007 | Kumagai et al. | ........... 280/730.2 |
| 7,954,846 B2* | 6/2011 | Iwayama et al. | ........... 280/730.2 |
| 8,596,678 B2* | 12/2013 | Ravenberg et al. | ........... 280/736 |
| 2010/0201108 A1* | 8/2010 | Iwayama et al. | ........... 280/730.2 |
| 2012/0043741 A1 | 2/2012 | Yamamoto | |
| 2012/0056410 A1 | 3/2012 | Yamamoto | |
| 2012/0129440 A1* | 5/2012 | Kitaguchi et al. | ............ 454/120 |
| 2012/0248746 A1 | 10/2012 | Yamamoto | |

FOREIGN PATENT DOCUMENTS

| | | |
|---|---|---|
| JP | 2000-177527 A | 6/2000 |
| JP | 2010-132072 A | 6/2010 |
| JP | 2010-214977 A | 9/2010 |
| JP | 2011-126497 A | 6/2011 |
| WO | 2010131326 A1 | 11/2010 |
| WO | 2010131518 A1 | 11/2010 |
| WO | 2011077510 A1 | 6/2011 |

* cited by examiner

*Primary Examiner* — Drew Brown
(74) *Attorney, Agent, or Firm* — Gifford, Krass, Sprinkle, Anderson & Citkowski, P.C.

(57) ABSTRACT

A side airbag device for a vehicle includes an inflator, which is provided in an outer side portion of a vehicle seat back in a vehicle width direction, and is operated and generates gas when a vehicle side impact is detected; a side airbag, which is provided on the side portion, partitioned into upper and lower bag portions, and expanded and deployed as gas from the inflator is distributed into the respective bag portions so that inner pressure of the lower bag portion becomes higher than that of the upper bag portion, the upper bag portion restraining a shoulder to an abdominal region, and the lower bag portion restraining a lumber region; and a restricting member, which is bridged between upper and lower end portions of the lower bag portion, and restricts a dimension of the lower bag portion in an upper-lower direction, in an expanded and deployed state.

20 Claims, 7 Drawing Sheets

SIDE AIRBAG DEVICE FOR VEHICLE

INCORPORATION BY REFERENCE

The disclosure of Japanese Patent Application No. 2013-060915 filed on Mar. 22, 2013 including the specification, drawings and abstract is incorporated herein by reference in its entirety.

BACKGROUND OF THE INVENTION

1. Field of the Invention

The invention relates to a side airbag device for a vehicle, which restrains a seated occupant by using a side airbag at the time of a side impact of the vehicle.

2. Description of Related Art

In a gas bag-type side collision protective device described in Japanese Patent Application Publication No. 2000-177527 A (JP 2000-177527 A), a gas bag (a side airbag) includes a chamber for thorax (an upper bag portion) that expands to a side of a thorax of an occupant, and a chamber for pelvis (a lower bag portion) that expands to a side of a pelvis of the occupant. It is possible to fill these chambers with gas by using a source of compressed gas so that the chambers in a filled state have different inner pressure from each other. For example, by reducing the inner pressure of the chamber for thorax so as to be smaller than the inner pressure of the chamber for pelvis, the thorax region, which is relatively vulnerable to an impact, is cushioned more softly than the pelvis.

Incidentally, a side airbag is compressed between a seated occupant and a side door as the side door intrudes into a vehicle interior side due to a force of a side impact. In such an event, the chamber for thorax and the chamber for pelvis are compressed into an oblong flat shape (an elliptical shape) when seen from a vehicle front-rear direction, and the dimension of each of the chambers in an upper-lower direction is increased. As a result, the high-pressure chamber for pelvis enters an abdominal region that has lower load resistance than the pelvis region, and a load on the abdominal region can increase.

SUMMARY OF THE INVENTION

The present invention provides a side airbag device for a vehicle, which is able to inhibit an increase in load on an abdominal region of a seated occupant due to a load from a lower bag portion that restrains a lumbar region of the seated occupant.

A first aspect of the present invention relates to a side airbag device for a vehicle. The side airbag device for vehicle includes an inflator, which is provided in a side portion of a seat back of a vehicle seat on an outer side in a vehicle width direction, and is operated and generates gas when a side impact of the vehicle is detected or predicted, a side airbag, which is provided on the side portion, partitioned into upper and lower bag portions, and expanded and deployed as gas from the inflator is distributed into the respective bag portions so that inner pressure of the lower bag portion becomes higher than inner pressure of the upper bag portion, the upper bag portion restraining a shoulder region to an abdominal region of a seated occupant, and the lower bag portion restraining a lumber region of the seated occupant, and a restricting member, which is bridged between both upper and lower end portions of the lower bag portion, and restricts a dimension of the lower bag portion in an upper-lower direction within a range that is previously set, in a state where the side airbag is expanded and deployed.

In the above aspect, once a side impact of the vehicle is detected or predicted, the inflator is operated and gas is generated. Then, gas is distributed into the upper and lower bag portions of the side airbag, and the side airbag is expanded and deployed. In the state where the side airbag is expanded and deployed, the inner pressure of the lower bag portion that restrains the lumber region of the seated occupant becomes higher than the inner pressure of the upper bag portion that restrains the shoulder region to the abdominal region of the seated occupant. Thus, it is possible to softly restrain the chest region and the abdominal region with relatively low load resistance by using the low-pressure upper bag portion, while effectively restraining the lumber region with relatively high load resistance by using the high-pressure lower bag portion.

Further, in the above aspect, in the state where the side airbag is expanded and deployed, the dimension of the lower bag portion in the upper-lower direction is restricted within a previously-set range by the restricting member that is bridged between both upper and lower end portions of the lower bag portion. Thus, when the side airbag is compressed between the seated occupant and a vehicle side portion due to a force of a side impact, it is possible to inhibit the high-pressure lower bag portion from carelessly entering the abdominal region side. As a result, it is possible to inhibit an increase in load on the abdominal region due to a load from the high-pressure lower bag portion. Further, by restricting the dimension of the lower bag portion in the upper-lower direction, it becomes unlikely that the lower bag portion is compressed in the vehicle width direction. Therefore, performance of the lower bag portion for restraining the lumber region is improved.

As explained above, in the side airbag device for a vehicle according to the first aspect of the present invention, it is possible to inhibit a load on the abdominal region of the seated occupant from increasing due to a load from the lower bag portion that restrains the lumbar region of the seated occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
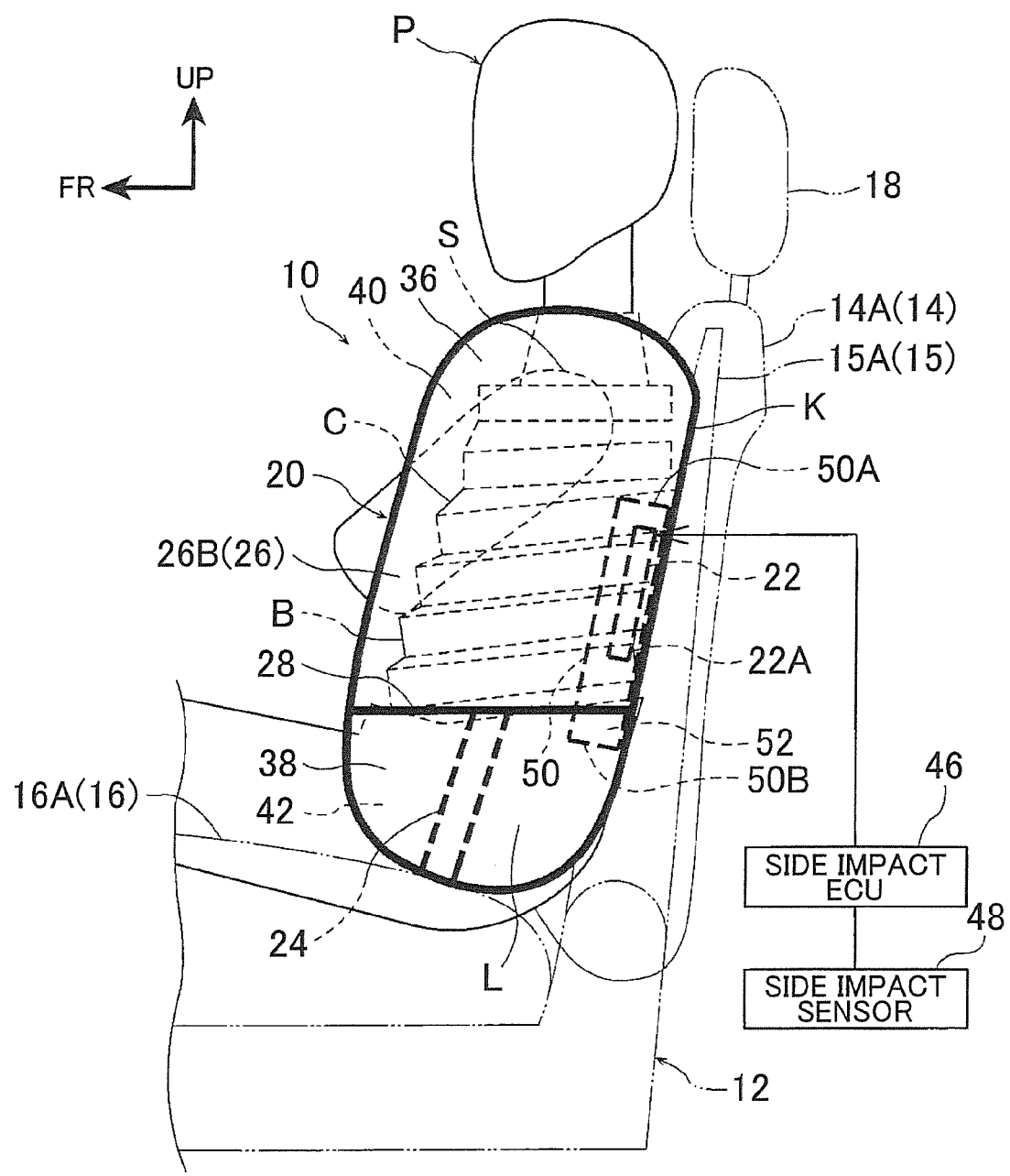
FIG. 1 is a schematic side view of a vehicle seat in which a side airbag device for a vehicle according to an embodiment of the present invention is installed, and is a view showing a expanded and deployed state of a side airbag.

A side airbag device 10 for a vehicle according to an embodiment of the present invention will be explained based on FIG. 1 to FIG. 4B. An arrow FR, an arrow UP, and an arrow OUT shown in the drawings as necessary indicate a front direction (an advancing direction) of a vehicle, an upper direction, and an outer side in a vehicle width direction, respectively. When explanation is given by simply using a front-rear direction and an upper-lower direction, front and rear in a vehicle front-rear direction, and upper and lower sides in a vehicle upper-lower direction are indicated, unless otherwise specified.

Structure

Figure 2:
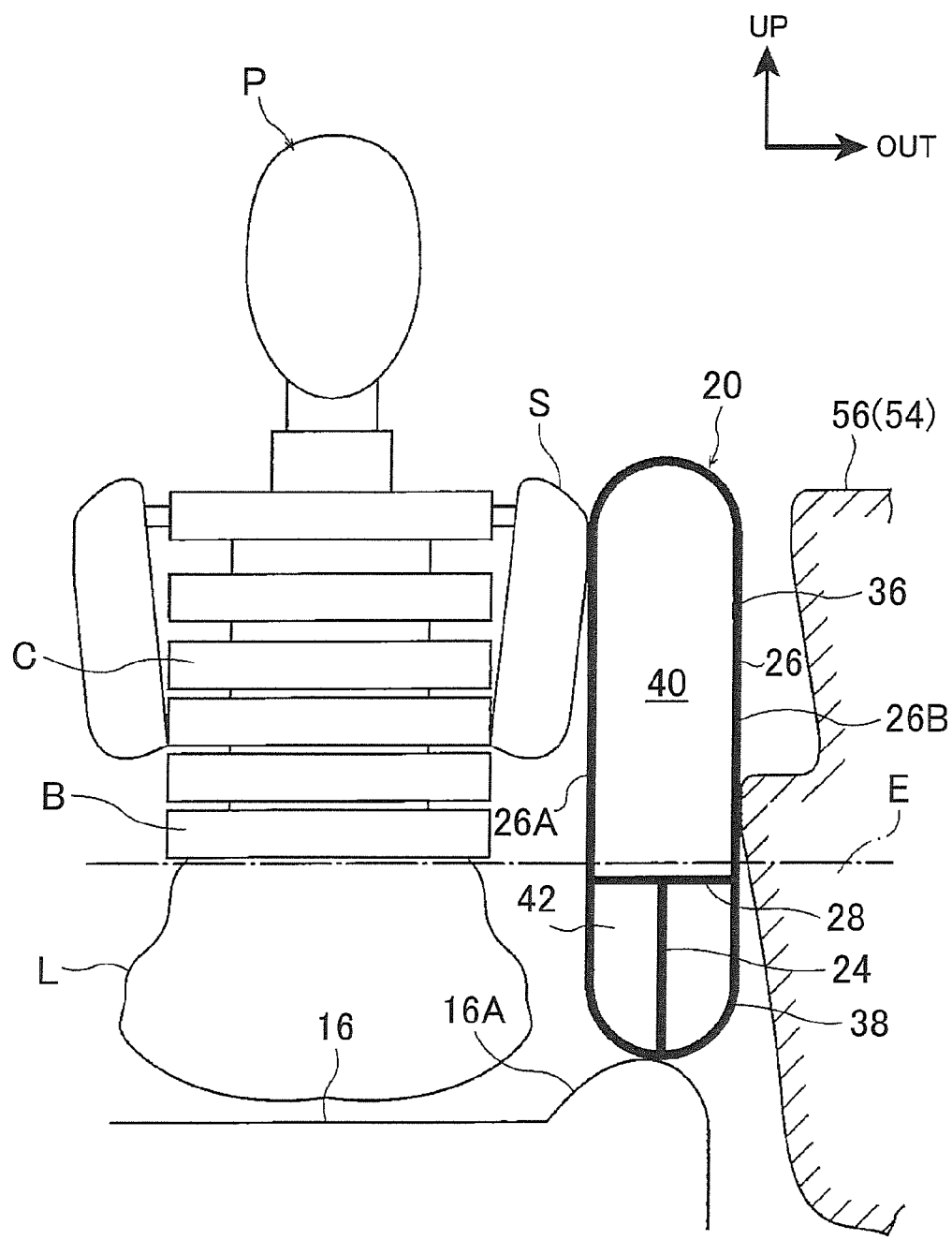
FIG. 2 is a partial sectional view showing the expanded and deployed state of the side airbag for a vehicle according to the embodiment of the present invention, and a peripheral structure of the side airbag seen from a front side of the vehicle.

As shown in FIG. 1, the side airbag device 10 according to this embodiment is installed in a side portion on a door side 14A in a seat back 14 of a vehicle seat 12 (the side portion on an outer side in a vehicle width direction: the side portion on a side of a side door 54 shown in FIG. 2). This seat back 14 is connected to a rear end portion of the seat cushion 16 so that the seat back 14 is able to be reclined. A head rest 18 is connected to an upper end portion of the seat back 14.

In this embodiment, a front-rear direction, a left-right direction (a width direction), and an upper-lower direction of the vehicle seat 12 coincide with the front-rear direction, a left-right direction (a width direction), and the upper-lower direction of the vehicle, respectively. In FIG. 1 and FIG. 2, a crash test dummy P is seated in the vehicle seat 12 instead of an actual occupant. The dummy P is, for example, AM50 (a model of a 50th percentile American adult male occupant) of WorldSID (World Side Impact Dummy). Herein below, the dummy P will be referred to as a "seated occupant P" in order to simplify the explanation.

The side airbag device 10 is structured by main parts that are a side airbag 20, an inflator 22 (a gas generating unit) that generates gas inside the side airbag 20, and a strap 24 (a restricting member) arranged inside the side airbag 20.

The side airbag 20 is folded and arranged (stored) inside the side portion on the door side 14A in a unitized (modularized) state together with the inflator 22 and so on, and is expanded and deployed between seated occupant P and a door trim 56 (see FIG. 2) of the side door 54 by pressure of gas that is generated from the inflator 22. When the side airbag 20 is expanded and deployed, a pad material and a skin material (both not shown) of the seat back 14 are broken as the pad material and the skin material receive expansion pressure of the side airbag 20. Front-rear and upper-lower directions of the side airbag 20 described in the explanation below indicate directions in a state where the side airbag 20 is expanded and deployed, unless otherwise specified, and generally coincide with front-rear and upper-lower directions of the seat back 14.

As shown in FIG. 1 to FIG. 3B, the side airbag 20 is a two-chambered side airbag having upper and lower chambers, and, formed into a bag shape by, for example, sewing one piece of base fabric 26 that is formed by being cut out from a nylon or polyester fabric material. The base fabric 26 is folded in half along a folding line K that is located on a rear end edge of the side airbag 20. Thereafter, a one side portion 26A and the other side portion 26B of the base fabric 26, which are divided through the folding line K, are superimposed onto each other, and peripheral edge portions of the one side portion 26A and the other side portion 26B are sewn at a periphery sewing portion T1 (see FIG. 3A and FIG. 3B; not shown in FIG. 1 and FIG. 2). The side airbag 20 having a bag shape may be formed by superimposing two pieces of base fabric and sewing peripheral edge portions of the two pieces of base fabric.

The side airbag 20 is arranged so that the one side portion 26A of the base fabric 26 faces an inner side in the vehicle width direction (the seated occupant P side), and the other side portion 26B of the base fabric 26 faces an outer side in the vehicle width direction (the side door 54 side) in the state where the side airbag 20 is expanded and deployed. Also, as shown in FIG. 1, the side airbag 20 is formed so as to have a generally long elliptical shape along a height direction of the seat back in a side view of the side airbag 20 in the expanded and deployed state, and the side airbag 20 is formed to be large enough to restrain a shoulder region S, a chest region C, an abdominal region B, and a lumbar region L of the seated occupant P. As shown in FIG. 2, in the state where the side airbag 20 is expanded and deployed, a lower end portion of the side airbag 20 is arranged so as to abut on or come close to an upper surface of a side support portion 16A of the seat cushion 16 on the side door 54 side.

The inside of the side airbag 20 is partitioned by a tether 28 (a partitioning fabric: a partition wall) serving as a partitioning portion. Two pieces of base fabric 30, 32 (see FIG. 3A and FIG. 3B) are formed into a long belt shape from a fabric material similar to that of the base fabric 26, and edge portions of long sides of the two pieces of base fabric 30, 32 are sewn at a sewing portion T2, thereby forming the tether 28. The tether 28 is formed into a long belt shape as a whole. One of edge portions of long sides of the tether 28 is sewn to the one side portion 26A of the base fabric 26 at a sewing portion T3, and the other edge portion of a long side of the tether 28 is sewn to the other side portion 26B of the base fabric 26 at a sewing portion T4.

In the state where the side airbag 20 is expanded and deployed, the tether 28 is arranged so as to extend along the vehicle front-rear direction at a height of a boundary between the abdominal region B and the lumbar region L of the seated occupant P (see the alternate long and short dash line E shown in FIG. 2: hereinafter, referred to as a "boundary E"). The side airbag 20 is partitioned by the tether 28 into an upper bag portion 36 and a lower bag portion 38. The inside of the upper bag portion 36 is referred to as an upper chamber 40, and the inside of the lower bag portion 38 is referred to as a lower chamber 42. A volume of the upper chamber 40 is set to be sufficiently larger than a volume of the lower chamber 42. The height of the foregoing boundary E is a height of an upper end of the pelvis.

Meanwhile, the inflator 22 is a cylinder-type inflator, and is formed into a cylindrical shape. The inflator 22 is arranged inside the upper bag portion 36 in a state where an axis direction of the inflator 22 is along a height direction of the seat back 14. In the state where the side airbag 20 is expanded and deployed, the inflator 22 is arranged so as to be located on a lower side of a rear end portion of the upper bag portion 36.

A pair of upper and lower stud bolts (not shown) projects from a peripheral portion of the inflator 22 towards an inner side in the vehicle width direction. The stud bolts pass through the one side portion 26A of the base fabric 26, and a side frame 15A of a seatback frame 15, and nuts (not shown) are screwed to distal end sides of the stud bolts. Therefore, the inflator 22 is fastened and fixed to the side frame 15A (so-called side face fastening) together with the side airbag 20. The stud bolts, which project to the vehicle rear side from the peripheral portion of the inflator 22, may pass though a bracket or the like, which is fixed to the side frame 15A, from the vehicle front side, and be screwed to nuts (so-called back face fastening).

In a lower end portion of the inflator 22, a gas ejecting portion 22A is provided, and gas is ejected from the gas ejecting portion 22A when the inflator 22 is operated. As shown in FIG. 1, a side impact ECU 46 installed in a vehicle is electrically connected to the inflator 22. A side impact sensor 48, which detects a side impact, is electrically connected to the side impact ECU 46. The side impact ECU 46 is structured so as to operate the inflator 22 when a side impact (or an unavoidable side impact) is detected based on a signal from the side impact sensor 48. In a case where a precrash sensor, which foresees (predicts) a side impact, is electrically connected to the side impact ECU 46, the inflator 22 may be operated when the side impact ECU 46 predicts a side impact based on a signal from the precrash sensor.

The above-mentioned inflator 22 is covered by an inner tube 50 (a flow straightener fabric) that is a constituent of the side airbag 20. The inner tube 50 is sewn into a tubular shape from a fabric material similar to that of the base fabric 26 of the side airbag 20, and the inflator 22 is inserted in an inner side of the inner tube 50. The pair of upper and lower stud bolts of the inflator 22 passes through the inner tube 50, and is sandwiched between the inflator 22 and the one side portion 26A of the base fabric 26.

The inside of the inner tube 50 is communicated with the inside of the upper bag portion 36 through an upper end opening 50A of the inner tube 50, which is located in an upper part of the upper bag portion 36. On a lower end side of the inner tube 50, the sewing portion T2 stated above is not set, and, the lower end side of the inner tube 50, which is inserted between the pieces of base fabric 30, 32, is sewn to the pieces of base portions or base fabric 30, 32 at a sewing portion (not shown). A lower end portion of the inner tube 50 projects inside the lower bag portion 38, and the inside of the inner tube 50 is communicated with the inside of the lower bag portion 38 through a lower end opening 50B of the inner tube 50, which is located inside the lower bag portion 38.

The inner tube 50 has a function to straighten a flow of gas ejected from the inflator 22. Gas ejected from the inflator 22 is ejected from the upper end opening 50A of the inner tube 50 towards the upper part of the inside of the upper bag portion 36, and also ejected from the lower end opening 50B of the inner tube 50 towards the inside of the lower bag portion 38. Thus, the side airbag 20 is expanded and deployed. In this case, it is set that the same amount of gas is ejected from the upper end opening 50A and the lower end opening 50B. Hence, inner pressure of the lower bag portion 38, which has a smaller volume than that of the upper bag portion 36, becomes higher than inner pressure of the upper bag portion 36.

The lower end portion of the inner tube 50, which projects into the lower bag portion 38, structures a check valve 52. Once the inner pressure of the lower bag portion 38 reaches a preset value or above, the check valve 52 is crushed and blocked. Thus, a flow of gas from the inside of the lower bag portion 38 to the inside of the upper bag portion 36 (a reverse flow) is limited, and high inner pressure of the lower bag portion 38 is maintained for a long period of time.

Figure 3A:
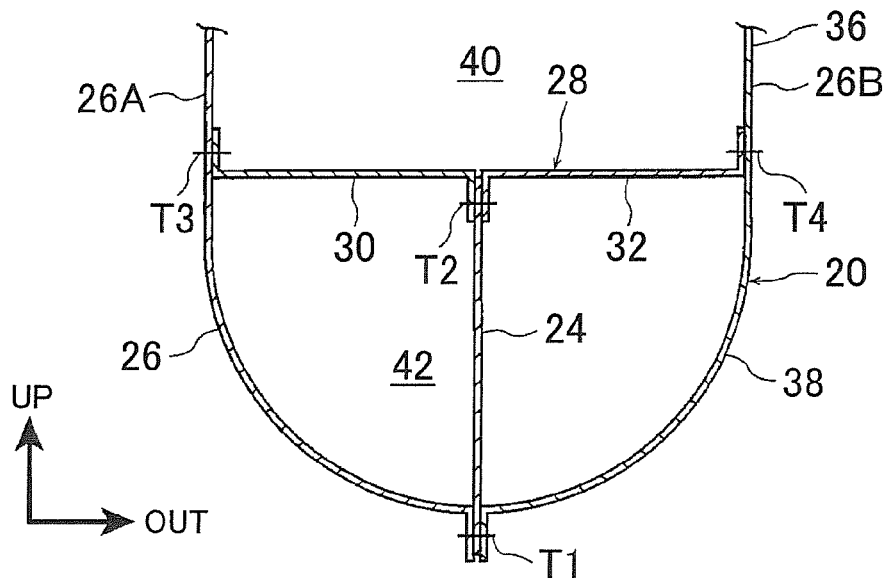
FIG. 3A is an enlarged sectional view showing an enlarged part of FIG. 2.

A strap 24, which serves as a restricting member, is arranged inside the lower bag portion 38. The strap 24 is formed into a long belt shape from a fabric material similar to (here, the same as) that of the base fabric 26 of the side airbag 20, in other words, a flexible sheet-shaped material, and is hard to be stretched. One end portion of the strap 24 in a longitudinal direction is sewn to a center portion of the tether 28 in a longitudinal direction, and also a center portion of the tether 28 in a width direction. To be specific, as shown in FIG. 3A, the one end portion of the strap 24 in the longitudinal direction is sandwiched between the pieces of base fabric 30, 32 that structure the tether 28, and, the pieces of base fabric 30, 32 and the one end portion of the strap 24 in the longitudinal direction are sewn together at the sewing portion T2.

The other end portion of the strap 24 in the longitudinal direction is sewn to a center portion of a lower end edge portion of the side airbag 20 in the front-rear direction. To be specific, as shown in FIG. 3A, the other end portion of the strap 24 in the longitudinal direction is sandwiched between the one side portion 26A and the other side portion 26B of the base fabric 26, and, the one side portion 26A, the other side portion 26B, and the other end portion of the strap 24 in the longitudinal direction are sewn together at the periphery sewing portion T1. Thus, the strap 24 is bridged between both upper and lower end portions of the lower bag portion 38.

Figure 3B:
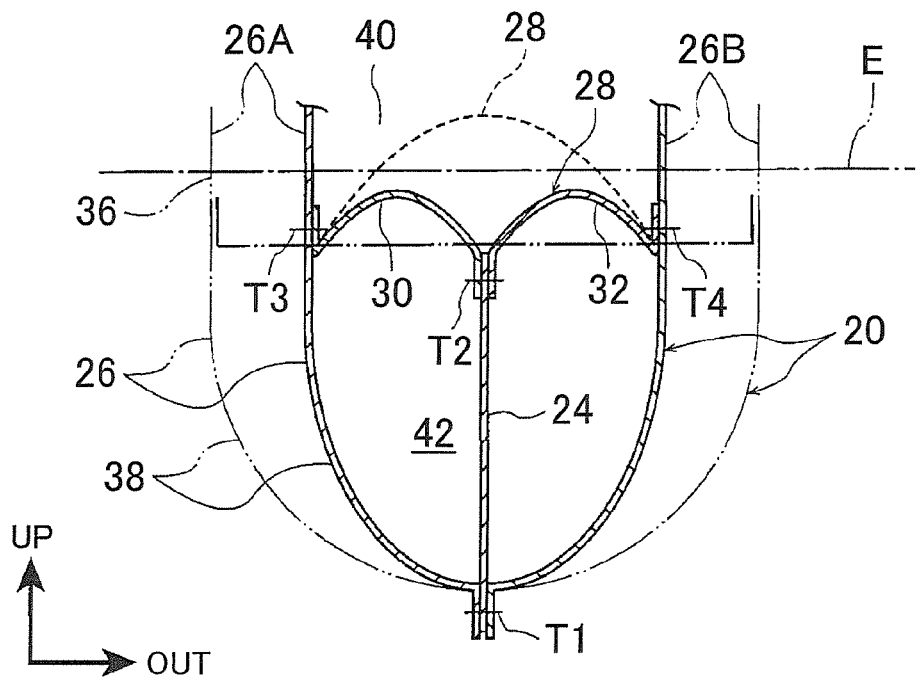
FIG. 3B is a sectional view corresponding to FIG. 3A, showing a state where the side airbag is compressed by a load in a vehicle width direction.

A length dimension of the strap 24 is set so that the strap 24 is stretched between both upper and lower end portions of the lower bag portion 38 in the state where the side airbag 20 is expanded and deployed, and a dimension of the lower bag portion 38 in the upper-lower direction is thus regulated within a range that is previously set, in the state where the side airbag 20 is expanded and deployed. This means that, when the lower bag portion 38 is compressed in the vehicle width direction as shown in FIG. 3B in the state where the side airbag 20 is expanded and deployed, the strap 24, which is stretched between both upper and lower end portions of the lower bag portion 38, is strained, thereby inhibiting an increase in the dimension of the lower bag portion 38 in the upper-lower direction. To be specific, even in the state where the lower bag portion 38 is compressed in the vehicle width direction, an increase in the dimension of the lower bag portion 38 in the upper-lower direction is restricted so as to inhibit the upper end portion of the lower bag portion 38 from projecting to the upper side beyond the aforementioned boundary E. In a case where the strap 24 is not provided, the tether 28 is expanded to the upper side as shown by the dashed line in FIG. 3B, and the upper end portion of the lower bag portion 38 projects to the upper side beyond the boundary E.

In the state where the side airbag 20 is expanded and deployed, the strap 24 is arranged in a posture where a thickness direction of the strap 24 is along the vehicle width direction, so that the strap 24 is located in the center of the inside of the lower bag portion 38 in the vehicle front-rear direction, and in the center of the inside of the lower bag portion 38 in the vehicle width direction. The position where the strap 24 is arranged is set on the vehicle front side of the lower end opening 50B (a gas supply port into the lower bag portion 38) of the inner tube 50, and gas ejected from the lower end opening 50B to a rear part of the inside of the lower bag portion 38 travels through both sides of the strap 24 in the thickness direction of the strap 24, and then is flown to a front part of the inside of the lower bag portion 38. The position where the strap 24 is arranged is a position that faces a center portion of a side surface of the lumbar region L of the seated occupant P in the front-rear direction, and, the position of the strap 24 faces the lumbar region L in the vehicle width direction.

Operations and Effects

Next, operations and effects of this embodiment will be explained.

In the side airbag device 10 having the above-mentioned structure, once the side impact ECU 46 detects a side impact based on a signal from the side impact sensor 48, the inflator 22 is operated by the side impact ECU 46. Then, gas ejected from the inflator 22 is ejected to the upper part of the inside of the upper bag portion 36 from the upper end opening 50A of the inner tube 50, and is also ejected to the inside of the lower bag portion 38 from the lower end opening 50B of the inner tube 50. Thus, the side airbag 20 is expanded and deployed between the seated occupant P and the door trim 56, the shoulder region S through the abdominal region B of the seated occupant P is restrained by the upper bag portion 36, and the lumbar region L of the seated occupant P is restrained by the lower bag portion 38. In the state where the side airbag 20 is expanded and deployed, the inner pressure of the lower bag portion 38 becomes higher than the inner pressure of the upper bag portion 36. Therefore, the lumbar region L having relatively high load resistance is restrained effectively by the high-pressure lower bag portion 38, and the chest region C and the abdominal region B having relatively low load resistance are restrained softly by the low-pressure upper bag portion 36.

Moreover, in this embodiment, the dimension of the lower bag portion 38 in the upper-lower direction is restricted within a previously set range by the strap 24 that is bridged between both upper and lower end portions of the lower bag portion 38, in the state where the side airbag 20 is expanded and deployed. This makes it possible to inhibit the high-pressure lower bag portion 38 from carelessly entering into the abdominal region B side when the side airbag 20 is compressed between the seated occupant P and the door trim 56 due to a force of a side impact.

Figure 4A:
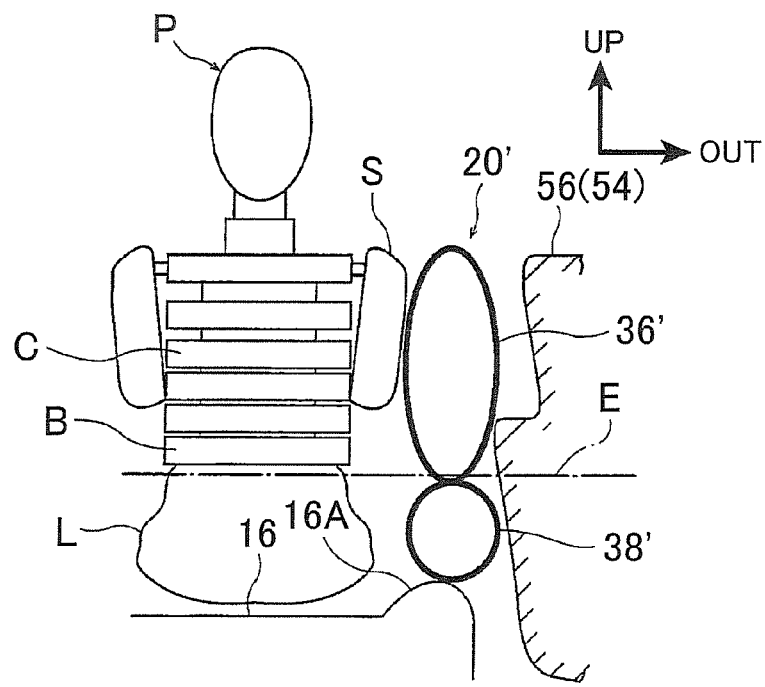
FIG. 4A is a partial sectional view corresponding to FIG. 2, showing an comparative example of the embodiment.
Figure 4B:
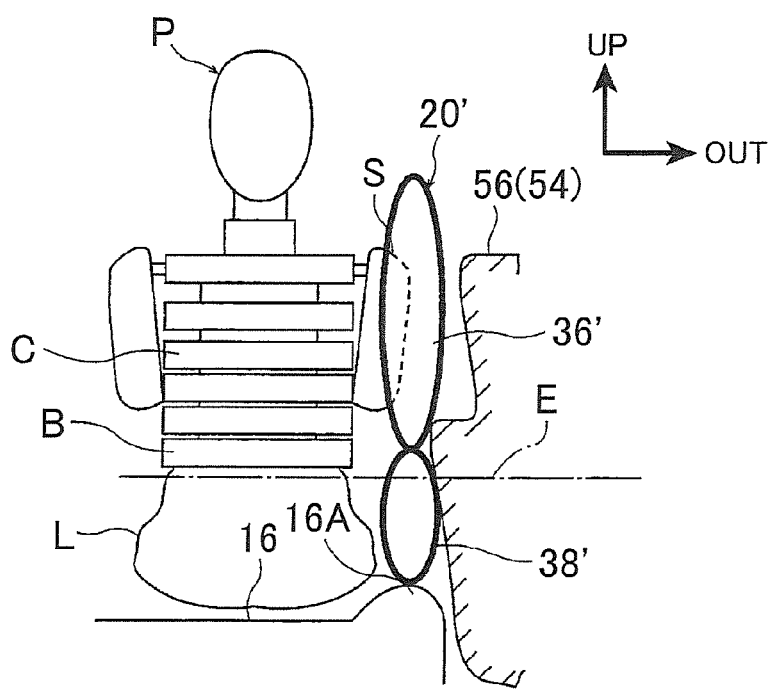
FIG. 4B is a sectional view corresponding to FIG. 4A, showing a state where the side airbag according to the comparative example is compressed by a load in the vehicle width direction.

In other words, as in a comparative example shown in FIG. 4A and FIG. 4B, in a case where the strap 24 is not attached to a lower bag portion 38' of a side airbag 20', sectional shapes of an upper bag portion 36' and the lower bag portion 38' become oblong flat shapes (elliptical shapes) when seen in the vehicle front-rear direction, as the side airbag 20' is compressed between a seated occupant P and a door trim 56. This means that the dimensions of the upper bag portion 36' and the lower bag portion 38' in the upper-lower direction are increased. As a result, the high-pressure lower bag portion 38' enters a side of an abdominal region B with low load resistance, and a load on the abdominal region B can be increased.

However, in this embodiment, since an increase in the dimension of the lower bag portion 38 in the upper-lower direction is restricted by the strap 24, it is possible to inhibit the high-pressure lower bag portion 38 from carelessly entering into the abdominal region B side. As a result, it becomes possible to inhibit an increase in a load on the abdominal region B due to a load from the high-pressure lower bag portion 38.

In addition, since the dimension of the lower bag portion 38 in the upper-lower direction is restricted, it becomes less likely that lower bag portion 38 is compressed in the vehicle width direction. Thus, a good expansion width of the lower bag portion 38 in the vehicle width direction is ensured, thereby improving performance of the lower bag portion 38 for restraining the lumbar region L.

In this embodiment, when the inner pressure of the lower bag portion 38 is increased by gas supplied from the inflator 22, the check valve 52 limits (or completely blocks) a reverse flow of the gas from the lower bag portion 38 to the upper bag portion 36. As a result, it is possible to maintain high inner pressure of the lower bag portion 38 from an early stage to a late stage of the restraint. Therefore, it is possible to improve the performance of the lower bag portion 38 for restraining the lumbar region L more effectively.

In this embodiment, the one end portion of the strap 24 in the longitudinal direction is sewn to the tether 28, and, at the same time, the other end portion of the strap 24 in the longitudinal direction is sewn to the periphery sewing portion T1 of the side airbag 20. By using the existing periphery sewing portion T1, it is possible to attach the strap 24 to the side airbag 20 with a simple structure.

In this embodiment, in the state where the side airbag 20 is expanded and deployed, the strap 24 is arranged so as to be located in the center of the inside of the lower bag portion 38 in the vehicle front-rear direction, and also in the center of the inside of the lower bag portion 38 in the vehicle width direction. Thus, it is possible to restrict the dimension of the lower bag portion 38 in the upper-lower direction in the vehicle front-rear direction in a well-balanced manner. The position where the strap 24 is arranged is a position that faces the center portion of the side surface of the lumbar region L of the seated occupant P in the front-rear direction, and, the position of the strap 24 faces the lumbar region L in the vehicle width direction. Therefore, the dimension of the lower bag portion 38 in the upper-lower direction is restricted by the strap 24, and it is thus possible to make it difficult for a load from the lower bag portion 38 to be inputted into the center portion of the side surface of the abdominal region B in the front-rear direction (in other words, a portion projecting most outwardly in the vehicle width direction).

In this embodiment, since the strap 24 is arranged as stated above, it is possible to inhibit the strap 24 from interfering a flow of gas supplied into the lower bag portion 38 from the lower end opening 50B of the inner tube 50. Since it is possible to supply gas to a front portion side of the lower bag portion 38 at an early stage, deployment performance of the lower bag portion 38 into a small gap between the lumbar region L of the seated occupant P and the door trim 56 is improved.

Further, in this embodiment, the strap 24 serving as the restricting member is formed from a fabric material that is a flexible sheet-shaped material. Therefore, when folding the side airbag 20, it is possible to fold the strap 24 together. Therefore, the strap 24 does not become an obstacle during the folding. In this embodiment, since the strap 24 is formed from the same fabric material as that of the base fabric 26 of the side airbag 20, it is possible to reduce costs for the strap 24. In addition, in the state where the side airbag 20 is expanded and deployed, the sheet-shaped strap 24 is in a posture in which the thickness direction of the strap 24 is along the vehicle width direction. Therefore, it is possible to make it less likely that gas, which is supplied into the lower bag portion 38 from the lower end opening 50B of the inner tube 50, interferes with the strap 24. This makes it possible to facilitate supply of gas to the front portion side of the lower bag portion 38.

In this embodiment, since the side airbag 20 is partitioned by the tether 28 into the upper bag portion 36 and the lower bag portion 38, it is possible to increase an expansion thickness of the upper bag portion 36 and the lower bag portion 38 (dimensions in the vehicle width direction in the state where the side airbag 20 is expanded and deployed) only by a width dimension of the tether 28. Thus, energy absorption strokes of the upper bag portion 36 and the lower bag portion 38 are ensured well.

Supplemental Explanation of the Embodiment

Figure 5:
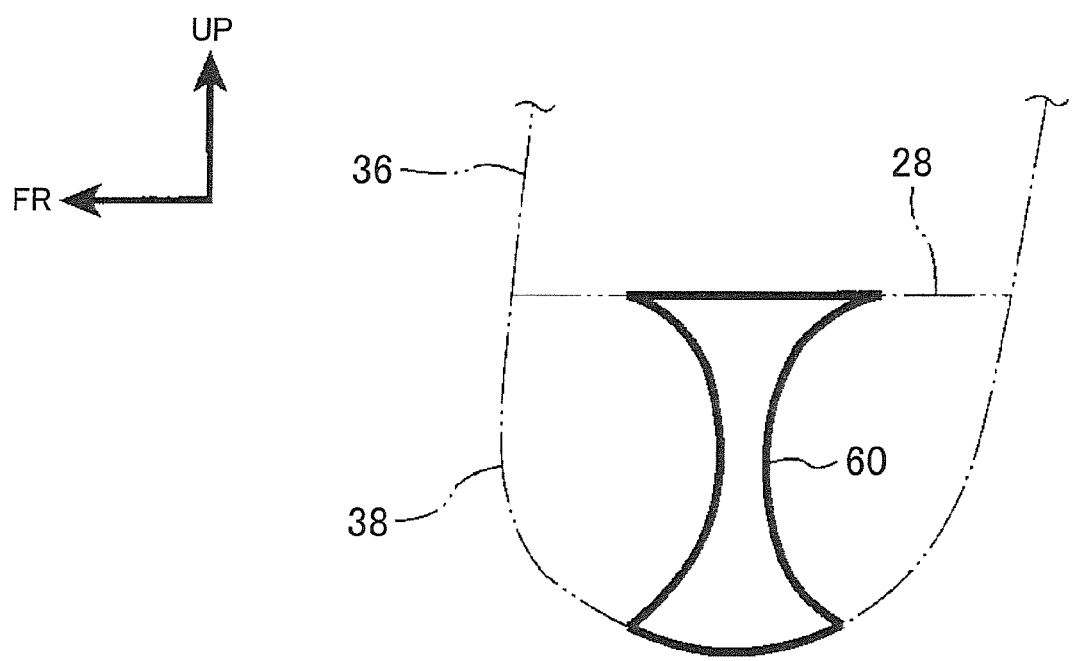
FIG. 5 is a developed plan view showing a first modified example of a strap according to the embodiment of the present invention.

In this embodiment, the strap 24 is formed into a long belt shape. However, the present invention is not limited to this, and the shape of the strap (the restricting member) may be changed as necessary. For example, like a strap 60 shown in FIG. 5, the strap 60 may be formed so that both end portions of the strap 60 in a longitudinal direction are wide, and a middle portion of the strap in the longitudinal direction is narrow. Thus, an increase in the dimension of the lower bag portion 38 in the upper-lower direction is restricted within a broad range in the vehicle front-rear direction, while inhibiting interference with a flow of gas inside the lower bag portion 38.

Figure 6:
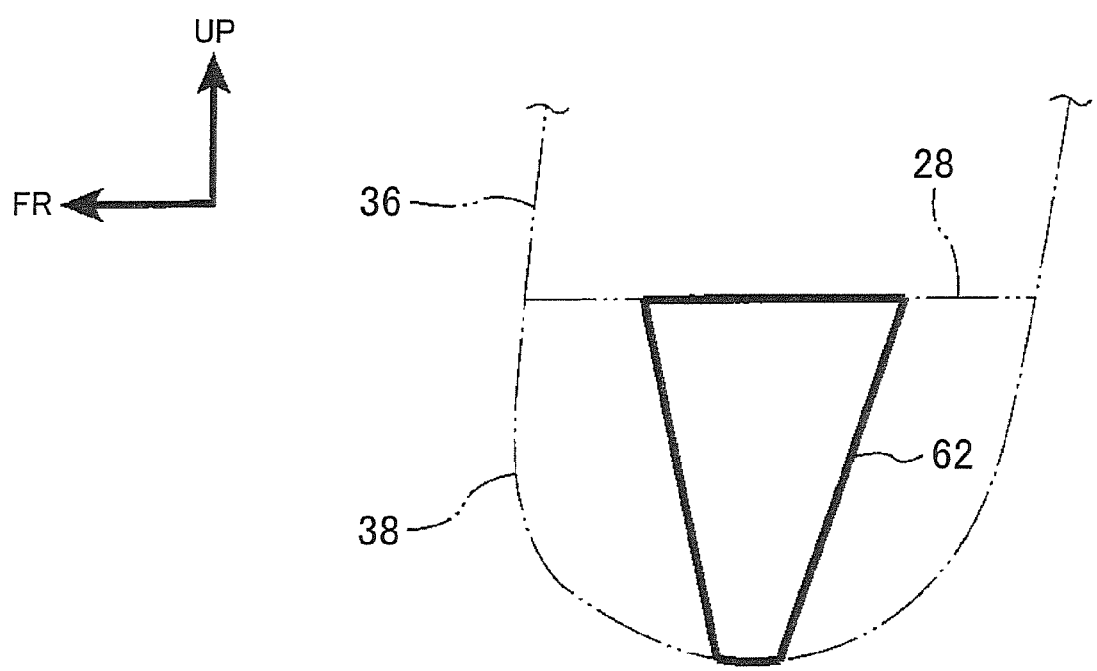
FIG. 6 is a developed plan view showing a second modified example of the strap according to the embodiment of the present invention.

For example, like a strap 62 shown in FIG. 6, the strap may be formed so that a width dimension of the strap 62 is gradually decreased from one end portion of the strap 62 in a longitudinal direction, which is sewn to the tether 28, towards the other end portion of the strap 62 in the longitudinal direction, which is sewn to a peripheral edge portion of the side airbag 20. In this structure, it is also possible to restrict an increase in the dimension of the lower bag portion 38 in the upper-lower direction, in a broad range in the vehicle front-rear direction.

Figure 7:
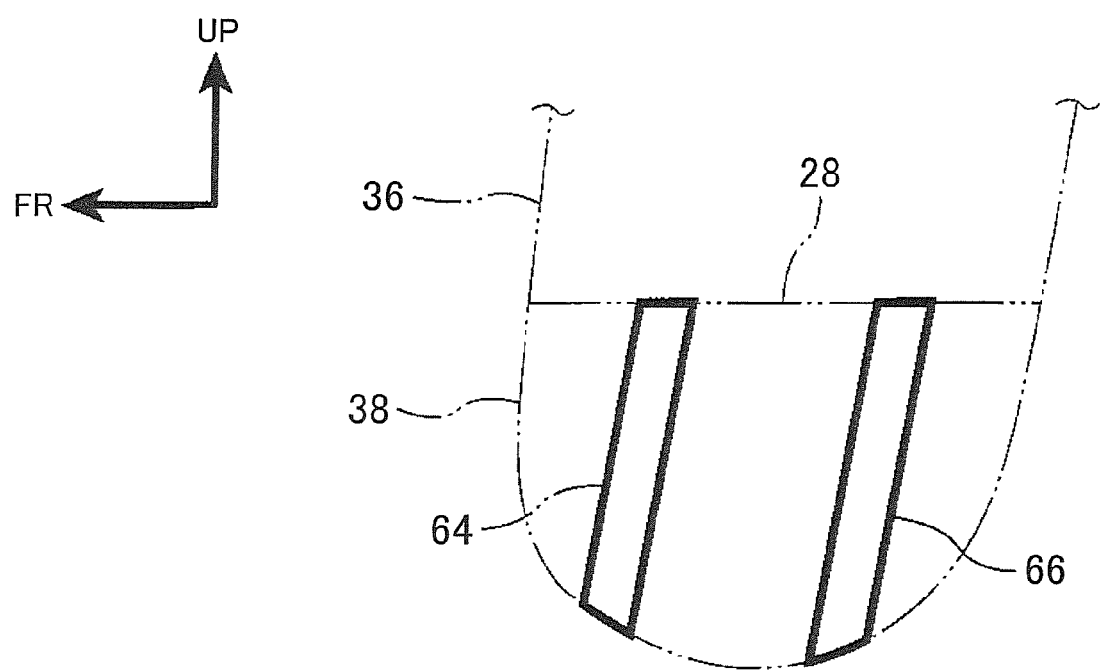
FIG. 7 is a developed plan view showing a third modified example of the strap according to the embodiment of the present invention.

In the foregoing embodiment, one piece of the strap 24 is provided inside the lower bag portion 38. However, the present invention is not limited to this, and, as shown in FIG. 7, a plurality of (here, two pieces of) straps 64, 66 aligned in the vehicle front-rear direction in the state where the side airbag 20 is expanded and deployed, may be provided inside the lower bag portion 38. With this structure, it is also possible to restrict an increase in the dimension of the lower bag portion 38 in the upper-lower direction in a broad-range in the vehicle front-rear direction.

In the foregoing embodiment, the strap 24 serving as the restricting member is formed from a flexible sheet-shaped material. However, the present invention is not limited to this, and a material for the restricting member may be changed as appropriate. For example, the restricting member may be formed from a reticular material.

In the foregoing embodiment, the lower end portion of the inner tube 50 works as the check valve 52. However, the present invention is not limited to this, and the check valve may be formed by the base fabric 26 of the side airbag 20 or the tether 28. One or both of the inner tube (the flow straightener fabric) and the check valve may be omitted.

In the foregoing embodiment, the side airbag 20 is partitioned into two bag portions that are the upper bag portion 36 and the lower bag portion 38. However, the present invention is not limited to this, and the side airbag may be partitioned into three bag portions or more. For example, in the foregoing embodiment, the upper bag portion 36 may be partitioned into a front part and a rear part, or the upper bag portion 36 may be partitioned into an upper part and a lower part.

In the foregoing embodiment, the other end portion of the strap 24 in the longitudinal direction is sewn to the base fabric 26 of the side airbag 20 at the periphery sewing portion Ti. However, the present invention is not limited to this, and the other end portion of the strap 24 in the longitudinal direction may be sewn to the base fabric 26 of the side airbag 20 at a sewing portion other than the periphery sewing portion T1.

In the foregoing embodiment, the side airbag 20 is partitioned by the tether 28 (the partitioning fabric: the partition wall) into the upper bag portion 36 and the lower bag portion 38. However, the present invention is not limited to this, and, the side airbag 20 may be partitioned into the upper bag portion 36 and the lower bag portion 38 by a sewing portion (a seam) where the one side portion 26A and the other side portion 26B of the base fabric 26 are sewn along the front-rear direction of the side airbag 20. In this case, one end portion of the strap 24 in the longitudinal direction may be sewn together to the sewing portion (a partitioning portion) between the upper bag portion 36 and the lower bag portion 38.

The present invention may changed variously without departing from the gist of the present invention, and carried out. As a matter of course, the scope of the present invention is not limited by the foregoing embodiment.

What is claimed is:

1. A side airbag device for a vehicle comprising:
   an inflator, which is provided in a side portion of a seat back of a vehicle seat on an outer side in a vehicle width direction, and is operated and generates gas when a side impact of the vehicle is detected or predicted;
   a side airbag, which is provided on the side portion, partitioned into upper and lower bag portions, and expanded and deployed as gas from the inflator is distributed into the respective bag portions so that inner pressure of the lower bag portion becomes higher than inner pressure of the upper bag portion, the upper bag portion restraining a shoulder region to an abdominal region of a seated occupant, and the lower bag portion restraining a lumber region of the seated occupant; and
   a restricting member, which is bridged between both upper and lower end portions of the lower bag portion, and restricts a dimension of the lower bag portion in an upper-lower direction within a range that is at or below a boundary between an abdominal region and a lumbar region of an AM50 crash test dummy, in a state where the side airbag is expanded and deployed.

2. The side airbag device for a vehicle according to claim 1, wherein
   the inflator is provided inside the upper bag portion, and
   the side airbag is provided with a check valve that limits a flow of gas from the lower bag portion to the upper bag portion due to an increase in the inner pressure of the lower bag portion.

3. The side airbag device for a vehicle according to claim 1, wherein
   one end portion of the restricting member is sewn to a partitioning portion between the upper bag portion and the lower bag portion, and the other end portion of the restricting member is sewn to a periphery sewing portion at which a peripheral edge portion of base fabric of the side airbag is sewn.

4. The side airbag device for a vehicle according to claim 1, wherein
   the restricting member is arranged so as to be located in a center of inside of the lower bag portion in a vehicle front-rear direction, and also in a center of the inside of the lower bag portion in the vehicle width direction in the state where the side airbag is expanded and deployed.

5. The side airbag device for a vehicle according to claim 1, wherein
   the restricting member is formed from a flexible sheet-shaped material.

6. The side airbag device for a vehicle according to claim 1, wherein,
   of end portions of the restricting member, which are bridged between both upper and lower end portions of the lower bag portion, at least one of the end portions is formed to be wide, and, a portion of the restricting member between the end portions is formed to be narrow.

7. The side airbag device for a vehicle according to claim 6, wherein,
of the end portions of the restricting member, both of the end portions are formed to be wide.

8. The side airbag device for a vehicle according to claim 1, wherein,
the restricting member is structured by a plurality of straps that are aligned in the vehicle front-rear direction in a state where the side airbag is expanded and deployed.

9. The side airbag device for a vehicle according to claim 1, wherein,
the inflator is open towards the upper bag portion and the lower bag portion, and is set so that a same amount of gas is ejected from each opening, and
a volume of the lower bag portion is smaller than a volume of the upper bag portion.

10. The side airbag device for a vehicle according to claim 2, wherein,
the check valve is blocked once the inner pressure of the lower bag portion is increased to a preset value or above.

11. The side airbag device for a vehicle according to claim 1, wherein,
the restricting member is a strap that is formed into a sheet shape, and a thickness direction of the strap is along the vehicle width direction.

12. A side airbag device for a vehicle comprising:
an inflator, which is provided in a side portion of a seat back of a vehicle seat on an outer side in a vehicle width direction, and is operated and generates gas when a side impact of the vehicle is detected or predicted;
a side airbag, which is provided on the side portion, partitioned into upper and lower bag portions by a partitioning portion provided at or below a boundary between an abdominal region and a lumbar region of an AM50 crash test dummy, and the side airbag is expanded and deployed as gas from the inflator is distributed into the respective bag portions so that inner pressure of the lower bag portion becomes higher than inner pressure of the upper bag portion, the upper bag portion restraining a shoulder region to an abdominal region of a seated occupant, and the lower bag portion restraining a lumber region of the seated occupant; and
a restricting member, which is bridged between both upper and lower end portions of the lower bag portion, and restricts a dimension of the lower bag portion in an upper-lower direction within a range that is previously set, in a state where the side airbag is expanded and deployed.

13. The side airbag device for a vehicle according to claim 12, wherein
the inflator is provided inside the upper bag portion, and
the side airbag is provided with a check valve that limits a flow of gas from the lower bag portion to the upper bag portion due to an increase in the inner pressure of the lower bag portion.

14. The side airbag device for a vehicle according to claim 12, wherein
one end portion of the restricting member is sewn to the partitioning portion between the upper bag portion and the lower bag portion, and the other end portion of the restricting member is sewn to a periphery sewing portion at which a peripheral edge portion of base fabric of the side airbag is sewn.

15. The side airbag device for a vehicle according to claim 12, wherein
the restricting member is arranged so as to be located in a center of inside of the lower bag portion in a vehicle front-rear direction, and also in a center of the inside of the lower bag portion in the vehicle width direction in the state where the side airbag is expanded and deployed.

16. The side airbag device for a vehicle according to claim 12, wherein
the restricting member is formed from a flexible sheet-shaped material.

17. The side airbag device for a vehicle according to claim 12, wherein,
of end portions of the restricting member, which are bridged between both upper and lower end portions of the lower bag portion, at least one of the end portions is formed to be wide, and, a portion of the restricting member between the end portions is formed to be narrow.

18. The side airbag device for a vehicle according to claim 17, wherein,
of the end portions of the restricting member, both of the end portions are formed to be wide.

19. The side airbag device for a vehicle according to claim 12, wherein,
the restricting member is structured by a plurality of straps that are aligned in the vehicle front-rear direction in a state where the side airbag is expanded and deployed.

20. A side airbag device for a vehicle comprising:
an inflator, which is provided in a side portion of a seat back of a vehicle seat on an outer side in a vehicle width direction, and is operated and generates gas when a side impact of the vehicle is detected or predicted;
a side airbag, which is provided on the side portion, partitioned into upper and lower bag portions by a partitioning portion, and the side airbag is expanded and deployed as gas from the inflator is distributed into the respective bag portions so that inner pressure of the lower bag portion becomes higher than inner pressure of the upper bag portion, the upper bag portion restraining a shoulder region to an abdominal region of a seated occupant, and the lower bag portion restraining a lumber region of the seated occupant; and
a restricting member, which is bridged between both upper and lower end portions of the lower bag portion, and restricts a dimension of the lower bag portion in an upper-lower direction within a range that is previously set, in a state where the side airbag is expanded and deployed, one end portion of the restricting member, in the longitudinal direction, is sandwiched between a pair of base portions that compose the partitioning portion, the one end portion of the restricting member and the pair of base portions are sewn at a sewn portion, and the other end portion of the restricting member is sewn to a periphery sewing portion at which a peripheral edge portion of base fabric of the side airbag is sewn.

* * * * *